United States Patent
Felegy

(10) Patent No.: US 6,742,723 B2
(45) Date of Patent: Jun. 1, 2004

(54) ARCHERY BOW STABILIZING SCENT DISPENSER

(76) Inventor: Edward M. Felegy, 229 N. Seventh St., Emmaus, PA (US) 18049

( * ) Notice: Subject to any disclaimer, the term of this patent is extended or adjusted under 35 U.S.C. 154(b) by 17 days.

(21) Appl. No.: 10/278,147

(22) Filed: Oct. 22, 2002

(65) Prior Publication Data

US 2004/0074991 A1 Apr. 22, 2004

(51) Int. Cl.⁷ .............................................. B65D 1/32
(52) U.S. Cl. .............................. 239/327; 239/289; 43/1
(58) Field of Search ................................ 239/289, 327, 239/340, 363, 369, 426, 434; 222/632, 633; 43/1

(56) References Cited

U.S. PATENT DOCUMENTS

| | | | |
|---|---|---|---|
| 2,896,840 A | * | 7/1959 | Hendry ........................ 417/479 |
| 4,156,496 A | | 5/1979 | Stinson |
| 4,245,612 A | | 1/1981 | Finlay |
| 4,802,626 A | | 2/1989 | Forbes et al. |
| D324,730 S | | 3/1992 | Salter et al. |
| 5,746,019 A | | 5/1998 | Fisher |
| 6,050,016 A | * | 4/2000 | Cox ................................... 43/1 |
| 6,158,668 A | * | 12/2000 | Burgeson ...................... 239/47 |
| 6,443,434 B1 | * | 9/2002 | Prather ......................... 261/26 |
| 6,592,104 B2 | * | 7/2003 | Cox .............................. 261/26 |

* cited by examiner

Primary Examiner—Michael Mar
Assistant Examiner—Thach H Bui
(74) Attorney, Agent, or Firm—Sanford J. Piltch, Esq.

(57) ABSTRACT

A compact lightweight atomizing scent dispenser which may be used to actively disperse liquid scent into the atmosphere as atomized droplets for the purpose of attracting game and masking the scent of a hunter, the scent dispenser including means to change the scent being dispensed without exposing the hunter to contact with the scent, the scent dispenser further being specifically adapted for mounting on an archery bow to function additionally as a bow stabilizer and a vibration and shock damper, the scent dispenser yet further incorporating a gravitationally based means to maintain an attached liquid scent bottle in an upright position to prevent spillage of the liquid scent and to provide vertical stabilization of the archery bow regardless of the orientation in which the bow is held with respect to the ground.

8 Claims, 5 Drawing Sheets

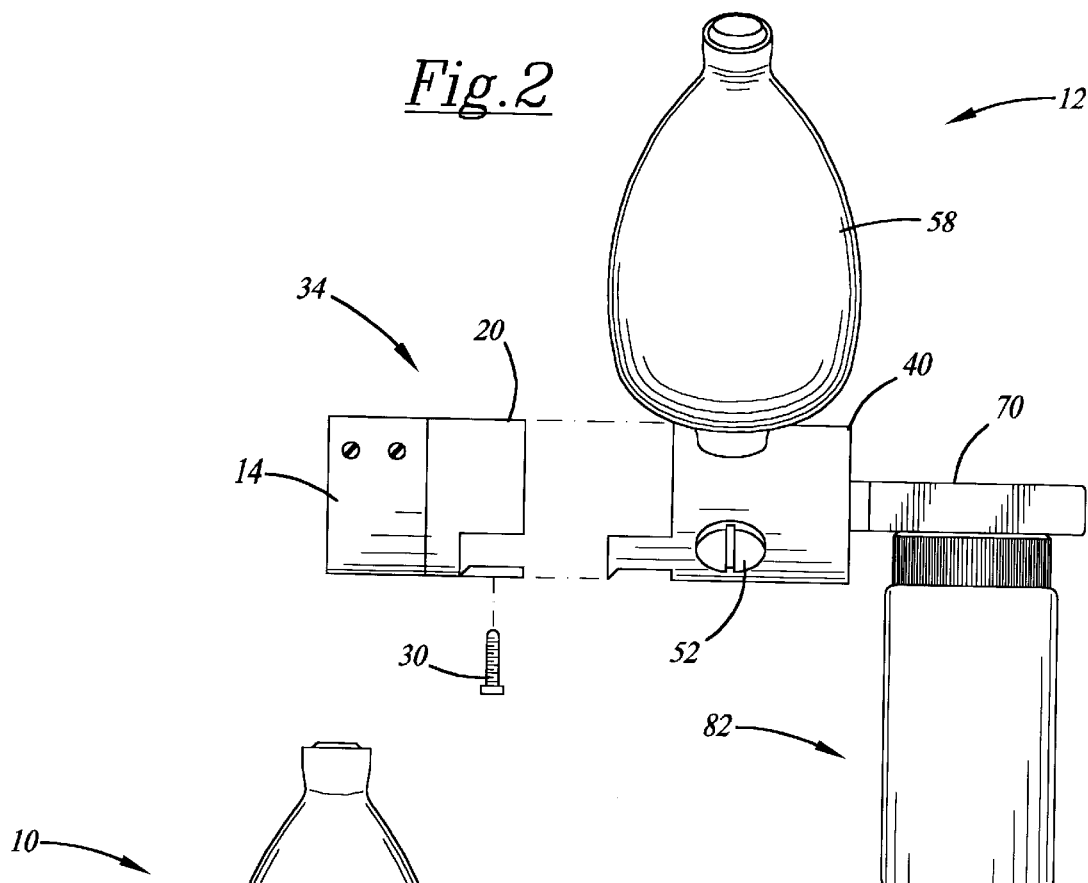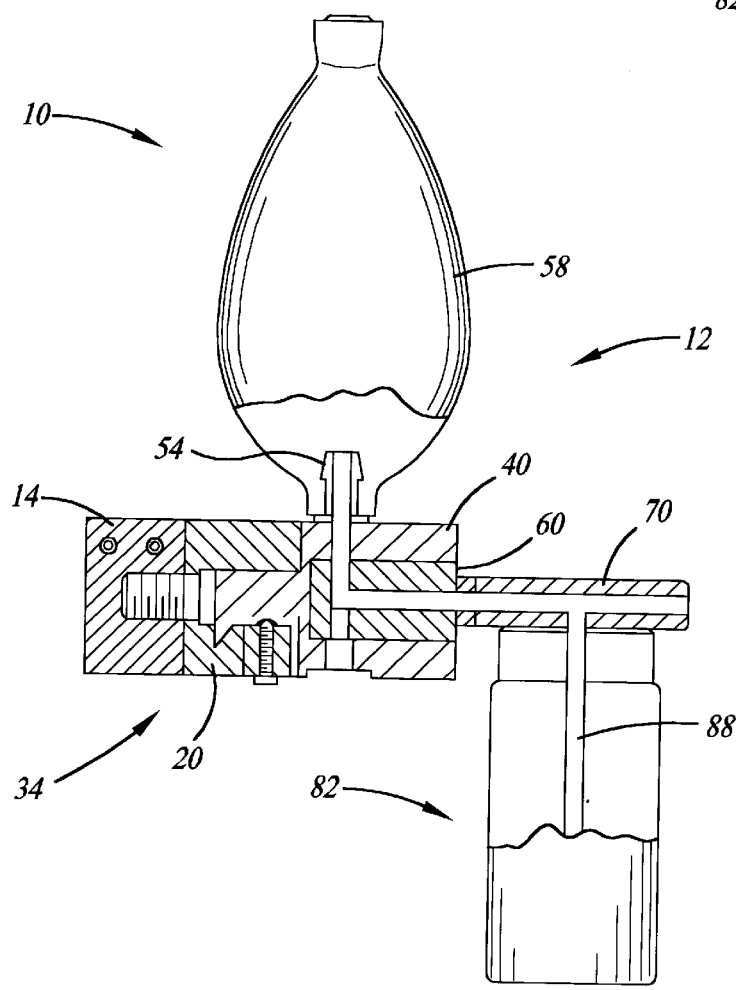

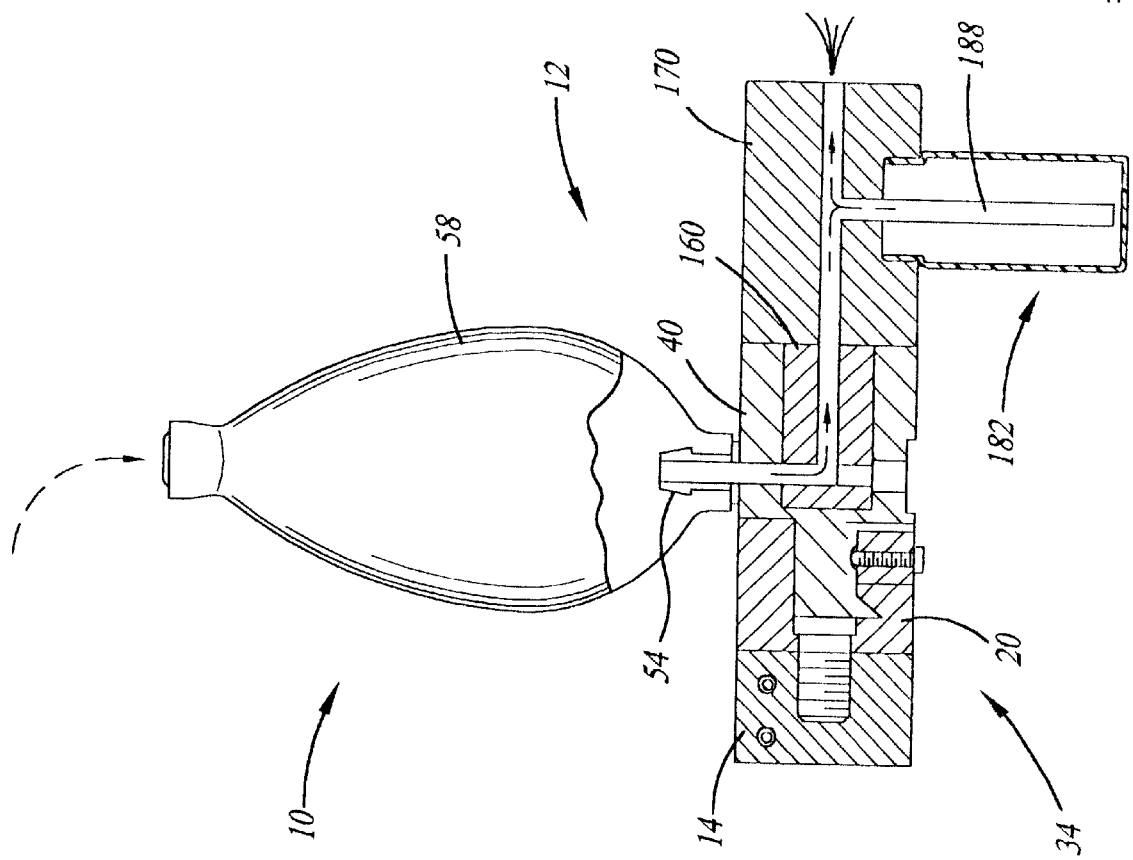

ARCHERY BOW STABILIZING SCENT DISPENSER

BACKGROUND OF THE INVENTION

The present invention relates generally to devices for dispensing a scent for use when hunting animals. More specifically, the present invention relates to a scent dispensing device mounted to an archery bow, additionally acting as a stabilizer to resist the torque and dampen the vibration and shock imparted to the bow when an arrow is released. The present invention may also serve as a wind direction detector upon release of the atomized fluid.

The use of scents by hunters to increase their chances of hunting success is well known. Various scents have been used to attract game and to mask the scent of the hunter so that the hunted animal is not alerted to the presence of the hunter and is instead drawn towards the hunter. The particular choice of scent, of course, depends upon the type of animal being hunted and may include, among others, musk, deer urine, raccoon urine, fox urine, acorn scent, pine scent, and skunk scent.

Prior forms of scent dispensers comprise a pad, sponge, wick, or like element that is treated or saturated with a liquid scent, and rely passively on evaporation and diffusion to disperse the scent into the air. This saturated pad type of scent dispenser is exemplified by U.S. Pat. No. 5,746,019 [Fisher] and U.S. Pat. No. 6,158,668 [Burgeson]. A disadvantage of this type of scent dispenser is that the rate of scent dispersal cannot be controlled when the device is in use. Some devices include the ability to retract the saturated pad into a sealed container to prevent the evaporation and dispersion of the scent, or to cover the openings in the container through which the scent is dispersed. However, none of the prior art devices enables the scent to be dispersed more rapidly than is provided for by the natural evaporation of the liquid scent and diffusion of the vaporized scent, based on the environmental conditions, i.e., current outdoor temperature, wind, and humidity conditions.

Another disadvantage of the saturated pad type of scent dispenser is that the scent may not be readily changed in the field. Since a used saturated pad will retain some residual scent, changing scents requires the changing of saturated pads, which exposes the hunter to the risk of coming into contact with the liquid scent, so that the hunter's skin and clothing may become contaminated with an undesirable scent. Additionally, retention of residual scent means that used saturated pads must be either disposed of, which can be wasteful, or used for the same scent, which may require the hunter to keep a set of saturated pads with one for each different scent used. Yet another disadvantage of this type of scent dispenser is that the scent dispenser is often a separate device that the hunter must transport into a remote hunting location, along with all of the other hunting equipment and paraphernalia that a hunter may already need to transport.

Various prior devices include scent dispensers in combination with other functions, in order to limit the number of separate devices a hunter must transport. For example, U.S. Pat. No. 4,156,496 [Stinson] teaches a saturated pad type scent dispenser incorporated into an archery bow mounted arrow quiver, and U.S. Pat. No. 4,245,612 [Finlay] teaches a saturated pad type scent dispenser incorporated into an archery bow stabilizer. In each of these patents, scent dispensing is a secondary function of the device and the simple saturated pad method suffers from the same disadvantages as the dedicated saturated pad scent dispensers discussed previously. More specifically, the disadvantages lie in the reliance on evaporation and diffusion to disperse the scent and the lack of ease of changing scents without exposing the hunter to contact with the scent.

Variations on the saturated pad type of scent dispenser are exemplified by U.S. Pat. No. 4,802,626 [Forbes, et al.], which patent discloses a scent impregnated plastic material, and U.S. Des. Pat. No. 324,730 [Salter, et al.], which shows an electrically stimulated scent impregnated material. While these devices overcome some of the difficulties in changing scents, they still passively rely on diffusion to disperse the scent and cannot control the rate at which the scent is emitted.

It should be noted that not one of the earlier devices actively disburses an atomized spray of scent into the air. In addition, none of the earlier devices provides for quick and simple changing of the scent being dispensed. In addition, many of the earlier devices are not compact and lightweight for transporting by a hunter to a remote hunting location, and are not adapted to be mounted to an archery bow or other hunting environment venue.

The use of stabilizers in connection with archery bows is known in the art. When an arrow is launched from a bow, the arrow is subjected to a sudden propulsive force, and consequently the bow is subjected to a sudden and equal reactive force transmitted through the bow string. Often, this propulsive force is accompanied by a vertical or lateral torque that may cause the arrow to deviate from its desired flight path. A stabilizer attached to the bow and extending forwardly therefrom will resist the torque which is imparted to the bow when an arrow is launched, and will therefore assist the hunter in keeping the arrow on its desired flight path. The stabilizer may also absorb the shock and vibration occurring when the arrow is launched from the bow.

An example of such stabilizers is found in U.S. Pat. No. 4,245,612 [Finlay], previously cited, which patent discloses an archery bow mounted stabilizer containing a saturated pad type scent dispenser. Disadvantages of this stabilizer design include that it is not easily removable from the bow in the field without tools and that it relies upon a flexible coupling to provide damping of the shock and vibration occurring when an arrow is launched.

Accordingly, it is an object of the present invention to provide a scent dispenser for hunting capable of disbursing scent into the air at the will of the hunter at a rate that is not dependant only upon evaporation and diffusion of a liquid scent. Additionally, it is an object of the present invention to provide a scent dispenser that enables the hunter to refrain from disbursing scent into the air when so desired. It is a further object of the present invention to provide a scent dispenser which is changeable to enable a hunter to disperse multiple scents without being exposed to contamination by the scent and without having to dispose of any previously used parts of the scent dispenser.

It is yet another object of the present invention to provide a scent dispenser for mounting on an archery bow which serves as a stabilizer to resist the torque and to dampen the shock and vibration imparted to the bow upon launching of an arrow, regardless of the angle at which the bow is held by the hunter. It is yet a further object of the present invention to provide a scent dispenser for mounting as a stabilizer on an archery bow that is compact and lightweight for ease of transporting by a hunter to a remote hunting location.

Other objects will appear hereinafter.

SUMMARY OF THE INVENTION

The present invention overcomes the disadvantages inherent in the types of hunting scent dispensers which have been previously known and used. Additionally, the present invention functions as an archery bow stabilizer, resulting in a combination of features not found in the prior art. The present invention provides an atomizing scent dispenser capable of being mounted on an archery bow or another mounting surface. The present invention is comprised of both a scent dispensing portion and a mounting portion.

The scent dispensing portion operates in a similar manner to a perfume atomizer. A squeeze bulb mounted to the dispenser body of the dispensing portion may be squeezed by the hunter to direct a pressurized air stream through the dispensing portion towards an atomizer body. The atomizer body serves as an aspirator, drawing liquid scent from an attached scent bottle assembly to mix into the pressurized air stream, with the combined stream of air and liquid scent being forced through an atomizer at the tip of the atomizer body and out into the atmosphere as atomized droplets. The atomizer body is rigidly supported by a cylindrical insert, which is rotatably mounted in a cylindrical cavity in the dispenser body, allowing the atomizer body and the scent bottle assembly to swivel about the dispenser body under the force of gravity so that the liquid filled bottle remains in an upright vertical position. An annular groove and a plurality of internal passages in the cylindrical insert provide a continuous flow path from the squeeze bulb through the dispenser body and through the cylindrical insert to the atomizer body. The cylindrical insert is retained in the cylindrical cavity of the dispenser body by a retaining screw which is threaded to the dispenser body and fits closely into the annular groove in the cylindrical insert. A keyed fixture on the proximal end of the dispenser body enables the dispensing portion to be supported by and secured to the mounting portion.

The mounting portion provides an easily detachable connection between the scent dispensing portion and a mounting surface. The mounting surface may be the handle of an archery bow, the forward extension of a mounted stabilizer, or alternatively, the mounting surface may a rigid member of a hunting stand or another solid object in the vicinity of the hunter. A mounting base is fastened to the bow or the mounting surface, and a mounting lug containing a keyed slot is secured to the mounting base. The keyed slot on the mounting lug receives the keyed fixture on the dispenser body of the scent dispensing portion and secures the keyed fixture in place using a retaining means which, when actuated, seats in a detent in the keyed fixture. The retaining means may be a spring plunger, a thumb screw, or an equivalent means known in the art. The dispensing portion may be readily removed to be exchanged for another essentially identical dispensing portion containing a different liquid scent simply by retracting the retaining mean s and sliding the keyed fixture of the dispensing portion out from the keyed slot of the mounting portion.

In operation, the present invention is designed particularly to disperse a desired amount of a selected scent at the will of a hunter. The hunter can control the amount of scent dispersed by controlling both the amount of air expelled from the squeeze bulb and the force and speed with which the squeeze bulb is actuated. If the squeeze bulb is not actuated, no scent is dispersed as the tiny physical size of the atomizer orifice is too small to allow for any noticeable evaporation of the liquid scent. If the hunter desires to utilize a different scent without changing the dispensing portion of the present invention, the liquid scent filled bottle may be easily replaced with a bottle containing the different liquid scent and the previous scent quickly flushed out of the scent dispenser with a few actuations of the squeeze bulb. If the hunter desires to utilize a different scent without the possibility of being exposed to the liquid scent, the entire dispensing portion can be exchange as previously described.

The present invention is further designed to provide a stabilizer for an archery bow which is additionally capable of damping vibration and shock in the archery bow upon the launching of an arrow therefrom. When mounted to an archery bow, the present invention extends forwardly therefrom, and is capable of providing stabilization of an archery bow held at any orientation with respect to the ground, as the design of the cylindrical insert allows the atomizer body and the scent bottle assembly to rotate under the force of gravity to maintain the liquid filled scent bottle in an upright vertical orientation and to maintain the force of the stabilizer in the downward direction. Also, any motion of the archery bow in response to the launching of an arrow causes a natural damping motion of the scent dispenser that serves to minimize vibration and shock in the archery bow.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

FIG. 2 is an exploded side view of the dispensing portion of the bow stabilizing scent dispenser of the present invention.

FIG. 3 is a partial sectional view of the bow stabilizing scent dispenser of the present invention.

FIG. 6 is a sectional view, similar to FIG. 3, but with a smaller diameter scent reservoir and showing the directional flow of air and atomized liquid scent through the bow stabilizing scent disperser of the present invention when operated.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
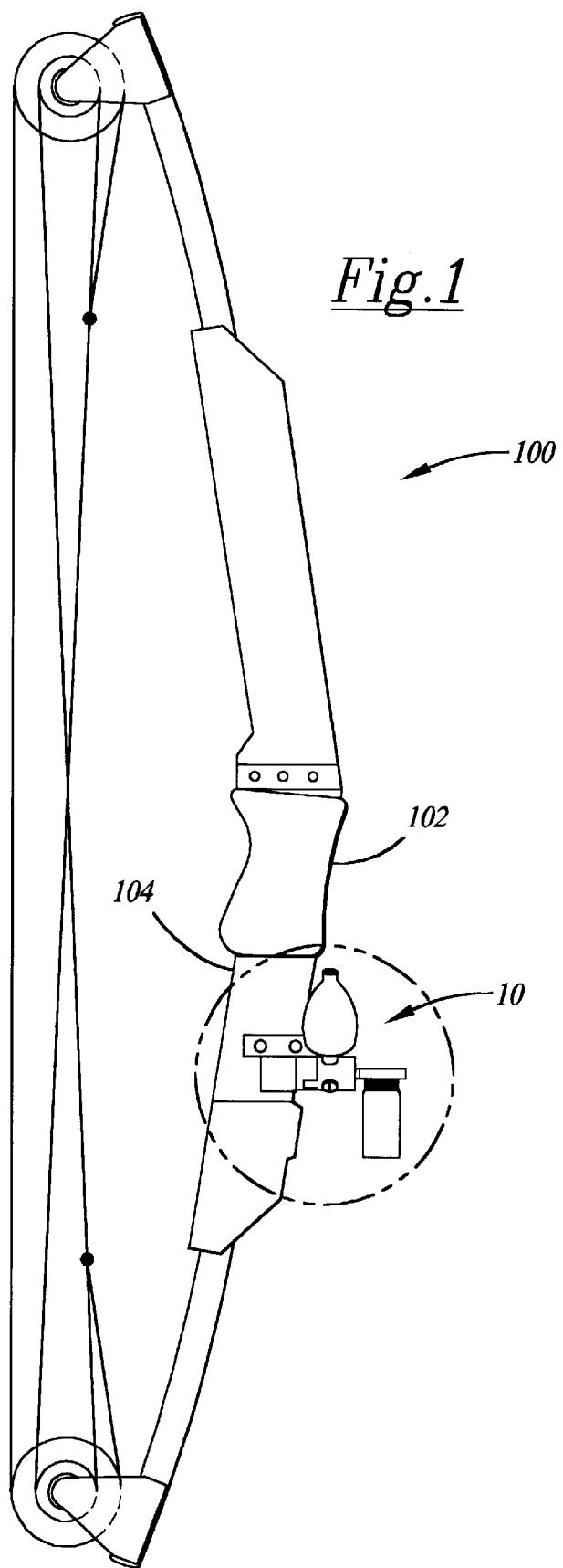
FIG. 1 is a side elevation view of the bow stabilizing scent dispenser of the present invention mounted to an archery bow.

Referring now to the drawings in detail, where like numerals refer to like parts or elements, there is shown in FIG. 1 a side elevation view of a bow stabilizing scent dispenser 10 of the present invention mounted on a compound archery bow 100. The compound archery bow 100 comprises a grip 102 and a lower handle 104. Although the bow 100 illustrated in FIG. 1 is a compound bow, the invention is not limited to combination with only a compound bow. The bow 100 may be of other types, e.g. long and recurved, which are known in the art. The bow stabilizing scent dispenser 10 is rigidly mounted to the lower handle 104 of the archery bow 100, out of the line of sight of the hunter and away from the release path of an arrow, and extending forwardly in the direction away from the hunter. Alternatively, the bow stabilizing scent dispenser 10 may be mounted to the front of a stabilizer attached to the bow frame at or about the same location.

The interrelationship of the parts of the apparatus 10 is best described with reference to the partial sectional view of FIG. 3 and the exploded view of FIG. 5. The bow stabilizing scent dispenser 10 comprises a mounting portion 34 having a mounting base 14 and a quick change mounting lug 20 secured to the mounting base 14, and a dispensing portion 12 having a dispenser body 40 connected to the mounting lug 20, a cylindrical swivel insert 60 retained inside the dispenser body 40, and an atomizer body 70 rigidly coupled to the swivel insert 60.

At the proximal end of the bow stabilizing scent dispenser 10, the mounting base 14 is fastened to the bow 100 by two mounting screws 16a, 16b, although a plurality of screws, rivets, or other equivalent fastening means may be employed. The mounting base 14 includes a blind-tapped hole 18 in the distal end thereof adapted to receive the threads of a bolt 28.

The mounting lug 20 is adapted with a countersunk bore 22 to receive the head of the bolt 28 and includes a hole 24 in the proximal end therethrough for the shaft of the bolt 28 to pass. The bolt 28 is a hex-head bolt with a screwdriver slot machined into the head, although a socket head cap screw may function equivalently, so that the bolt 28 may be accessed for tightening or loosening from the opening in the distal end of the mounting lug 20. The bolt 28 rigidly secures the mounting lug 20 to the mounting base 14. Alternatively, the mounting lug 20 may be mounted to any mounting base comprising a tapped hole adapted for the, bolt 28, enabling the bow stabilizing scent dispenser 10 without the mounting base 14 to be used apart from the archery bow 100. In addition, the mounting lug 20 provides for easy removal of the dispensing portion 12, shown in FIG. 2, from mounting portion 34, enabling the archery bow to be transported or used with the mounting portion 34 attached thereto but with the dispensing portion 12 removed therefrom.

The mounting lug 20 further includes at its distal end a keyed slot 32 adapted for mating with a matching keyed fixture 42 located at the proximal end of the dispenser body 40. Although the specific keyed shape illustrated in FIGS. 2, 3, and 5 is of a triangular shape, alternate keyed shapes, including but not limited to a keyhole, a T-slot, an L-slot, and a dovetail slot, may be used. A tapped hole 26 on the lower side of the mounting lug 20 extends therethrough between the outside of the mounting lug 20 and the internal space of the keyed slot 32 thereof. The keyed fixture 42 of the dispenser body 40 slides into the keyed slot 32 of the mounting lug 20 and is secured in place by a retaining means 30 which is threaded into the tapped hole 26 in the mounting lug 20 and is actuated into a detent 44 in the lower side of the keyed fixture 42 of the dispenser body 40. The retaining means 30 may optionally be a spring plunger, a thumb screw, or other equivalent means which is easily actuated and retracted by the hunter.

The dispenser body 40 includes, at the distal end thereof, a cylindrical cavity 46 adapted for receiving the cylindrical swivel insert 60. A tapped hole 48 in the lower side of the dispenser body 40 extends between the outside of the dispenser body 40 and the cylindrical cavity 46. A tapped hole 50 in the upper side of the dispenser body 40 extends between the outside of the dispenser body 40 and the cylindrical cavity 46. A bulb adapter 54, comprising a barbed end, an internally threaded end, and a small diameter internal passage connecting the ends therethrough, is coupled to the upper side of the dispenser body 40 by a hollow threaded coupling 56 which threads into the internally threaded end of the bulb adapter 54 and into the threaded hole 50 in the dispenser body 40. The outlet end of a squeeze bulb 58 slips over the barbed end of the bulb adapter 54.

Figure 5:
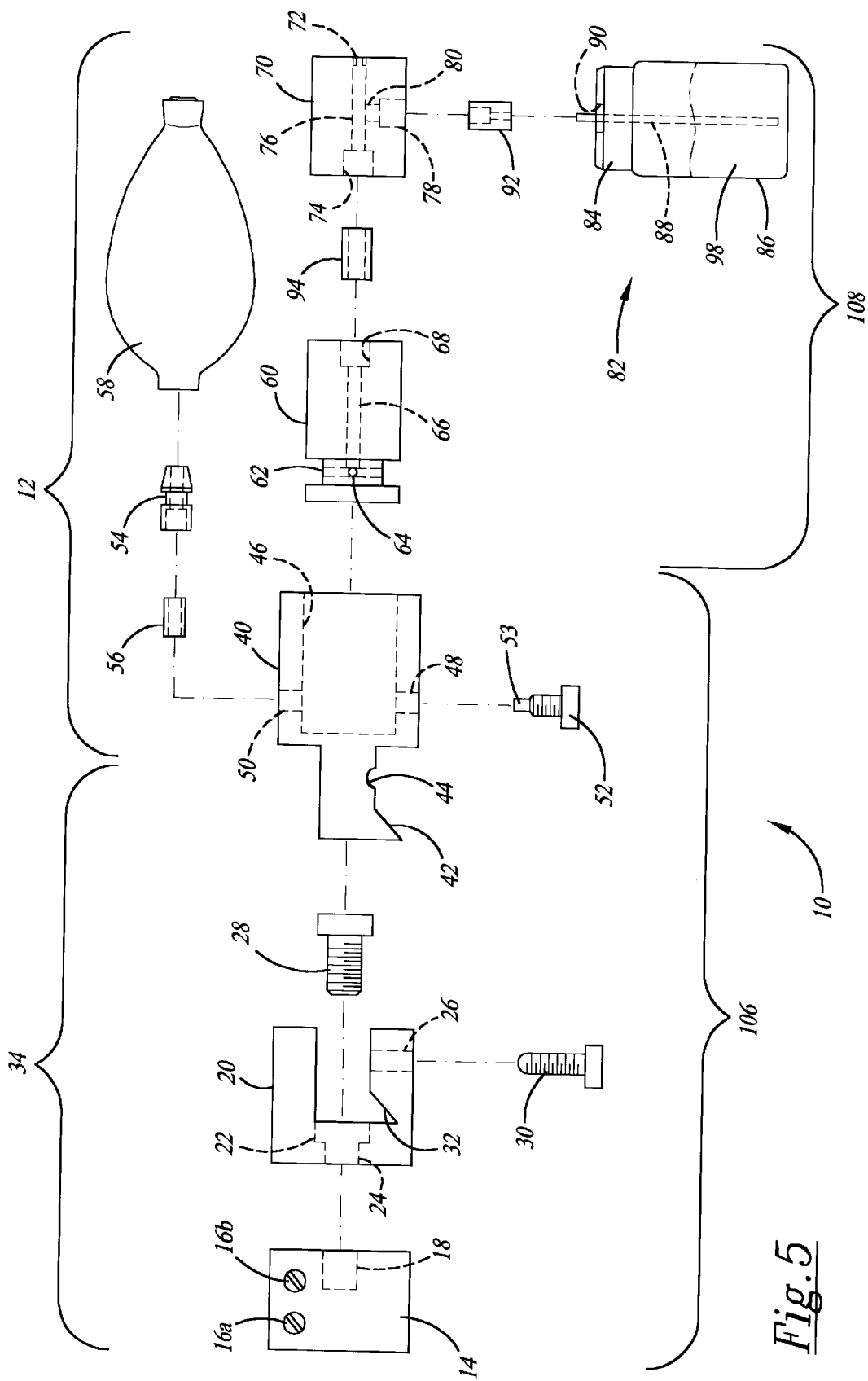
FIG. 5 is an exploded view showing the components of the bow stabilizing scent dispenser of the present invention.

A swivel insert 60 includes an annular groove 62 near the proximal end thereof, a tapped countersunk hole 68 in the distal end thereof, a small diameter internal passage 66 extending from the tapped countersunk hole 68 in the distal end thereof to the longitudinal position of the annular groove 62, and four small diameter holes 64 each connecting the outside of the annular groove 62 to the passage 66, the holes 64 being evenly spaced around the annular groove 62, so that a continuous flow path exists between the annular groove 62 and the tapped countersunk hole 68. [See FIG. 5]. The outside diameter of the swivel insert 60 is slightly smaller than the inside diameter of the cylindrical cavity 46 in the dispenser body 40, enabling the swivel insert 60 to rotate freely when inserted. A swivel retaining screw 52, which is threaded into the tapped hole 48 in the dispenser body 40, extends into the cylindrical cavity 46 and further extends into the annular groove 62 to retain the swivel insert 60. The diameter of unthreaded tip 53 of the swivel retaining screw 52 is slightly smaller than the thickness of the annular groove 62, allowing the swivel insert 60 to rotate freely while restraining the motion thereof in the axial direction.

The atomizer body 70 comprises an atomizer 72 at the distal end thereof, a tapped countersunk hole 74 at the proximal end thereof, and a small diameter internal passage 76 connecting the ends therethrough so that a continuous flow path exists between the tapped countersunk hole 74 and the atomizer 72. [See FIG. 5]. A hollow threaded coupling 94 connects the distal end of the swivel insert 60 to the proximal end of the atomizer body 70 by threading into the tapped hole. 68 on the swivel insert 60 and into the tapped hole 74 on the atomizer body 70. A tapped countersunk hole 78 in the lower side of the atomizer body 70 is provided for connecting the atomizer body 70 to a scent bottle assembly 82. A small diameter internal passage 80 in the lower side of the atomizer body 70 connects tapped countersunk hole 78 to internal passage 76.

The scent bottle assembly 82 comprises a scent bottle 86 containing a liquid scent 98, a bottle cap 84, and a scent dip tube 88. Internal threads on the bottle cap 84 mate with external threads at the top of the scent bottle 86, providing a seal which prevents the liquid scent 98 from leaking out. Alternatively, the bottle cap 84 and the scent bottle 86 may be connected and sealed by other means commonly known in the art. A tapped hole 90 in the bottle cap 84 is provided to connect the scent bottle assembly 82 to the atomizer body 70. A hollow threaded coupling 92 couples the atomizer body 70 to the bottle assembly 82 by threading into the tapped countersunk hole 78 on the atomizer body 70 and into the tapped hole 90 extending through the bottle cap 84. The inside diameter of the hollow threaded coupling 92 is slightly smaller than the outside diameter of the scent dip tube 88, the scent dip tube 88 being press fit into the hollow threaded coupling 92. The scent dip tube 88 extends from the hollow threaded coupling. 92 to the bottom of scent bottle 86, enabling the scent dip tube 88 to extract nearly all of the liquid scent 98 from the scent bottle 86.

When the dispensing portion 12 of apparatus 10 is assembled, as illustrated in FIGS. 2 and 3, the keyed fixture 42 of the dispenser body 40 is slip fitted into the keyed slot 32 of the mounting lug 20 and is secured in position by the retaining means 30 being actuated into the detent 44; the squeeze bulb 58 is mounted to the dispenser body 40 by means of the bulb adapter 54 and the hollow coupling 56; the swivel insert 60 is rotatably fitted into the cylindrical cavity 46 of the dispenser body 40 and is retained in position by the tip 53 of the swivel retaining screw 52; the atomizer body 70 is coupled to the swivel insert 60 by the hollow coupling 94 and to the scent bottle assembly 82 by the hollow coupling 92 with the dip tube 88 extending from the hollow coupling 92 to the bottom of the scent bottle 86.

As shown in FIG. 6, a continuous internal passage is formed connecting both the squeeze bulb 58 and the dip tube 88 to the atomizer 72. When the squeeze bulb 58 is actuated, pressurized air is forced through the hole 50 in the dispenser body 40, flowing through the annular groove 62, through at least one of the holes 64 and through the internal passage 66 in the swivel insert 60, into the atomizer body 70 which functions as an aspirator, drawing the liquid scent 98 up through the dip tube 88, and sending a combined stream of the pressurized air and the liquid scent 98 through the atomizer 72 and out into the atmospheric air as atomized droplets of scent. Scent can be dispersed at the will of the hunter, in any quantity desired depending both on the amount of air expelled from the squeeze bulb 58 and the force and speed with which the squeeze bulb 58 is actuated.

It should be noted that the size of the scent bottle, or scent reservoir 86 is not dependent upon the amount of liquid scent or the effect on stabilization of the bow. With reference to FIG. 6, and enlarged atomizer body 170, having the same diameter as the dispenser body 40, may be mounted to the bow stabilizing scent dispenser 10 through the cylindrical swivel insert 160. The bottle assembly 182 mounts to the atomizer body 170 by any of the methods described above with the dip tube 188 extending downward into the bottom of the bottle assembly 182 to provide for the dispensing of substantially all of the liquid scent through the atomizer opening 72. The flow path shown in FIG. 6 of the air and liquid scent entrained in the air is substantially identical as the flow path described above. The enlarged atomizer body 170 is shown to provide a clearer understanding of how the bow stabilizing scent dispenser 10 will attach forward of a stabilizer mounted to the bow frame and exhibit the identical dimensions as the stabilizer.

Figure 4:
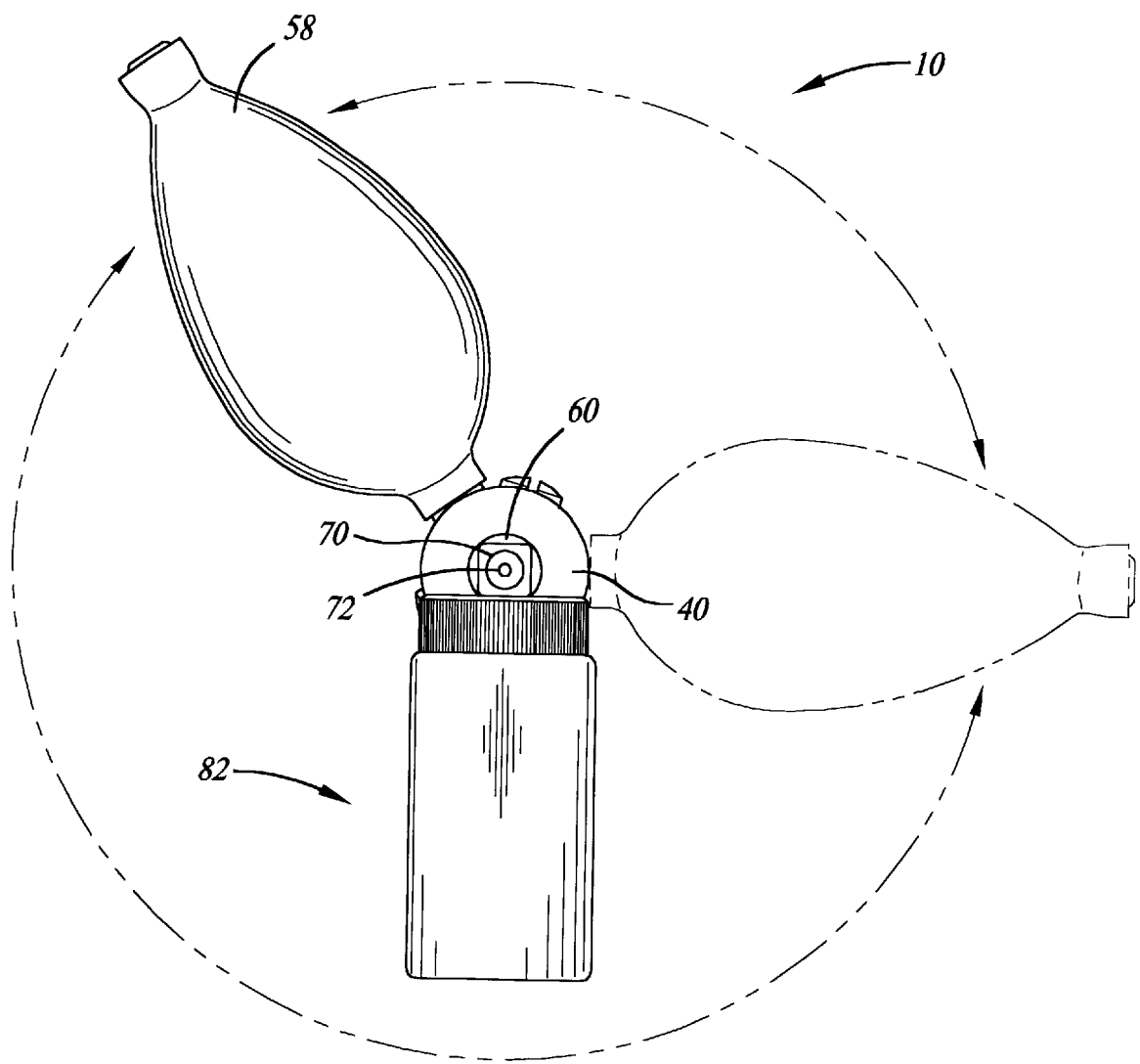
FIG. 4 is an end view of the bow stabilizing scent dispenser of the present invention showing the movement capabilities of various components of the invention.

When the dispensing portion 12 is attached to the mounting base 14 by the bolt 28, and the mounting based 14 is attached to the lower handle 104 of the archery bow 100 by the mounting screws 16a, 16b, the apparatus 10 is ready for use in hunting. As assembled, the apparatus 10 can be viewed as a fixed portion 106 and a rotatable portion 108, rotatably connected as described above and capable of rotational movement as illustrated in FIG. 4. The fixed portion 106 comprises the mounting base 14, the quick change mounting lug 20, the dispenser body 40, and the squeeze bulb 58, while the rotatable portion 108 comprises the swivel insert 60, the atomizer body 70, and the scent bottle assembly 82. When the fixed portion 106 is rigidly connected to the archery bow 100, the rotatably portion 108 is free to rotate based on the gravitational force exerted on the scent bottle assembly 82, enabling the scent bottle 86 to remain in an upright position regardless of the position of the archery bow 100, and thus preventing the liquid scent 98 from spilling when the hunter holds the archery bow 100 at various orientations with respect to the ground. As is illustrated in FIG. 4, regardless how the fixed portion 106 is oriented, the rotatable portion 108 retains the same upright vertical orientation.

For use during bow hunting, the bow stabilizing scent dispenser 10 is mounted to extend forwardly from the archery bow 100, as shown in FIG. 1, enabling the scent dispensing apparatus 10 to further function as a stabilizer, resisting the vertical and lateral torque normally imparted to the bow 100 when an arrow is launched. Additionally, the squeeze bulb 58 serves to dampen the shock and vibration, and the twang, created by the launching of an arrow.

The bow stabilizing scent dispenser 10 may also be mounted to any other fixed base hunting apparatus such as a tree stand handle or rail, or to a stake mounted into the ground. Regardless of the mounting location of the bow stabilizing scent dispenser 10, it can be utilized as a wind direction detector by expelling some of the atomized liquid scent and watching the atomized air entrained scent disperse into the air immediately in front of the bow stabilizing scent dispenser 10. Thus, a small amount of atomized air entrained scent will readily provide the wind direction information to the hunter easily and without the need for a separate detection device.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency, which are also intended to be embraced therein.

What is claimed is:

1. A scent dispenser for attachment to a mounting surface comprising:
    an atomizer body having an internal passage interconnecting between an air inlet, a scent inlet, and an atomizer;
    a bottle assembly for containing a liquid scent, said bottle assembly coupled to the scent inlet of said atomizer body;
    a dispenser body having a cylindrical cavity and a plurality of internal passages connecting between the outer wall thereof and the cylindrical cavity;
    a generally cylindrical insert rotatably retained inside the cylindrical cavity of said dispenser body by a retaining means to maintain the dispenser body in a substantially vertical orientation, said cylindrical insert having an internal passage with an inlet and an outlet, the inlet being aligned with one or more of the internal passages of said dispenser body, the outlet being coupled to the air inlet of said atomizer body; and
    a squeeze bulb mounted to the outer wall of said dispenser body and coupled to one of the internal passages thereof.

2. The scent dispenser of claim 1 wherein said dispenser body further includes an external keyed fixture disposed away from the cylindrical cavity thereof, said scent dispenser further comprising:
    a mounting lug having a keyed slot capable of receiving the keyed fixture of said dispenser body and a retaining means for securing said keyed fixture in said keyed slot;
    a mounting means for attaching said mounting lug to a mounting surface.

3. The scent dispenser of claim 2, wherein the mounting surface is the handle of an archery bow, enabling said scent dispenser to additionally function as a stabilizer to resist the vertical and lateral torque and damp the vibration and shock imparted to said archery bow when an arrow is launched.

4. A method of dispersing a scent using a scent dispenser having a mounting portion comprised of a mounting lug having a keyed slot adapted for use with a mounting means with a keyed fixture secured in the keyed slot of said mounting lug by a retaining means, a dispensing portion comprised of an atomizer body having an internal passage interconnecting an air inlet, a scent inlet, and an atomizer; a liquid scent containing bottle assembly coupled to the scent inlet of said atomizer body; a dispenser body including a cylindrical cavity, a plurality of internal passages interconnecting between the outer wall thereof and said cylindrical cavity, a generally cylindrical insert rotatably retained in the cylindrical cavity of said dispenser body by a retaining means to maintain the dispenser body in a substantially vertical orientation, said cylindrical insert having an internal passage with an inlet and an outlet, the inlet being aligned with one or more of the internal passages of said dispenser body, the outlet being coupled to the air inlet of said atomizer body; and a squeeze bulb mounted to the outer wall of said dispenser body and coupled to one of the internal passages thereof, said method comprising steps of:

filling said scent bottle assembly with a desired liquid scent;

aiming said scent dispenser towards the direction in which it is desired to disperse scent;

actuating said squeeze bulb forcing pressurized air into the internal passages of said dispenser body, through the internal passage of said cylindrical insert, and into the internal passage of said atomizer body via the air inlet, the pressurized air drawing the liquid scent into the internal passage of said atomizer body via the scent inlet, causing a combined stream of the pressurized air and the liquid scent to be dispersed by the atomizer of said atomizer body into the atmosphere as atomized droplets.

5. The method of claim 4, said method further comprising an initial step of mounting said scent dispenser to a mounting surface using said mounting means.

6. The method of claim 5, wherein the mounting surface is the handle of an archery bow, enabling said scent dispenser to function additionally as a stabilizer to resist the vertical and lateral torque and damp the vibration and shock imparted to the archery bow when an arrow is launched.

7. The method of claim 6, said method further comprising the steps of:

uninstalling said dispensing portion from said mounting portion by retracting said retaining means and sliding the keyed fixture of said dispensing portion out from the keyed slot of said mounting portion;

installing an alternate dispensing portion comprising an alternate scent liquid by sliding the keyed fixture of said alternate dispensing portion into the keyed slot of said mounting portion and actuating said retaining means, said alternate dispensing portion otherwise being identical to said dispensing portion, so that a hunter may easily and quickly disperse multiple scents without being exposed to contact with any liquid scent.

8. The method of claim 5, wherein the mounting to a mounting surface enables said scent dispenser to function additionally as a wind direction detector.

* * * * *